(12) United States Patent
Comisky et al.

(10) Patent No.: US 6,665,767 B1
(45) Date of Patent: Dec. 16, 2003

(54) PROGRAMMER INITIATED CACHE BLOCK OPERATIONS

(75) Inventors: David A. Comisky, Plano, TX (US); Sanjive Agarwala, Richardson, TX (US); Timothy D. Anderson, Dallas, TX (US); Charles L. Fuoco, Allen, TX (US)

(73) Assignee: Texas Instruments Incorporated, Dallas, TX (US)

( * ) Notice: Subject to any disclaimer, the term of this patent is extended or adjusted under 35 U.S.C. 154(b) by 195 days.

(21) Appl. No.: 09/603,333

(22) Filed: Jun. 26, 2000

Related U.S. Application Data (60) Provisional application No. 60/166,535, filed on Nov. 18, 1999, and provisional application No. 60/144,550, filed on Jul. 15, 1999.

(51) Int. Cl.$^7$ ............................................. G06F 12/00
(52) U.S. Cl. ........................ 711/3; 711/143; 711/144; 711/145
(58) Field of Search .............................. 711/123, 125, 711/126, 144, 145, 143, 3

(56) References Cited

U.S. PATENT DOCUMENTS 6,049,866 A * 4/2000 Earl ............................ 711/123

* cited by examiner

*Primary Examiner*—Donald Sparks
*Assistant Examiner*—Paul Baker
(74) *Attorney, Agent, or Firm*—Robert D. Marshall, Jr.; W. James Brady, III; Frederick J. Telecky, Jr.

(57) ABSTRACT

This invention enables a program controlled cache state operation on a program designated address range. The program controlled cache state operation could be writeback of data cached from the program designated address range to a higher level memory or such writeback and invalidation of data cached from the program designated address range. A cache operation unit includes a base address register and a word count register loadable by the central processing unit. The program designated address range is from a base address for a number of words of the word count register. In the preferred embodiment the program controlled cache state operation begins upon loading the word count register. The cache operation unit may operate on fractional cache entries by handling misaligned first and last cycles. Alternatively, The cache operation unit may operate only on whole cache entries. The base address register increments and the word count register decrements until when the word count reaches zero.

16 Claims, 6 Drawing Sheets

(1) L1I CACHE MISS FILL FROM L2
(2) L1D CACHE MISS FILL FROM L2
(3) L1D WRITE MISS TO L2, OR L1D VICTIM TO L2, OR L1D SNOOP RESPONSE TO L2
(4) L2 CACHE MISS FILL, OR DMA INTO L2
(5) L2 VICTIM WRITE BACK, OR DMA OUT OF L2
(6) DMA INTO L2
(7) DMA OUT OF L2

PROGRAMMER INITIATED CACHE BLOCK OPERATIONS

This application claims priority under 35 USC §119(e)(1) of Provisional Application No. 60/144,550, filed Jul. 15, 1999 and Provisional Application No. 60/166,535, filed Nov. 18, 1999.

TECHNICAL FIELD OF THE INVENTION

The technical field of this invention is control of cache memory in data processors and particularly programmer control of invalidation or flushing of selected parts of a second level cache in a digital signal processor.

BACKGROUND OF THE INVENTION

Data processing systems typically employ data caches and instruction caches to improve performance. A small amount of high speed memory is used as the cache. This cache memory is filled from main memory on an as needed basis. When the data processor requires data or an instruction, this is first sought from the cache memory. If the data or instruction sought is already stored in the cache memory, it is recalled faster than it could have been recalled from main memory. If the data or instruction sought is not stored in the cache memory, it is recalled from main memory for use and also stored in the corresponding cache. A performance improvement is achieved using cache memory based upon the principle of locality of reference. It is likely that the data or the instruction just sought by the data processor will be needed again in the near future. Use of cache memories speeds the accesses needed to service these future needs. A typical high performance data processor will include instruction cache, data cache or both on the same integrated circuit as the data processor core.

Cache memories are widely used in general purpose microprocessors employed in desktop personal computers and workstations. Cache memories are frequently used in microprocessors employed in embedded applications in which the programmable nature of the microprocessor controller is invisible to the programmer. Caching provides a hardware managed, programmer transparent access to a large memory space via a physically small static random access memory (SRAM) with an average memory access time approaching the access time of the SRAM. The hardware managed and programmer transparent aspect of cache systems enables better performance while freeing the programmer from explicit memory management.

Cache memories are typically not used with digital signal processors. Digital signal processors are generally used in applications with real time constraints. Such real time constraints typically do not operate well with cache memories. When employing cache memories the access time for a particular instruction or data cannot be predetermined. If the sought item is stored in the cache, then the access time is a known short time. However, if the item sought is not stored in the cache, then the access time will be very much longer. The determination of hit or miss is controlled by the cache autonomously, but is generally unknown to the programmer without extensive analysis of the access patterns of a particular code segment. Furthermore, since the state of the cache controls the events performed by the cache, it may be necessary to analyze complete systems and long sequences of events in order to predict and control the operation of said cache. Additionally, other demands for main memory access will make the access time from main memory vary greatly. This variation in memory access time makes planning for real time applications extremely difficult or impossible.

In some systems, it is highly desirable to provide a level of control to the programmer over cache operations. For example, it may be necessary for a cache system to support a writeback mechanism, whereby the programmer can direct the cache to write data in the cache back to external memory for shared access by another processor, which doesn't have access to the cache. Similarly, it is often desirable to be able to clear or invalidate cache entries so that new data can be accessed at addresses which have been updated in the reference memory.

Many caches provide some level of the above functionality. Such functions are normally implemented as a set of control registers, either within the central processing unit or addressable as memory mapped control registers. Typically, writeback and invalidate mechanisms take the form of a control bit, or address register whereby the programmer can force the writeback and/or invalidation of a particular cache line or possibly a cached address from the cache. These known techniques typically make programming programmer directed cache operations difficult and tedious.

SUMMARY OF THE INVENTION

This invention enables a program controlled cache state operation on a program designated address range. The program controlled cache state operation could be writeback of data cached from the program designated address range to a higher level memory or such writeback and invalidation of data cached from the program designated address range.

A cache operation unit includes a base address register and a word count register. These registers are loadable by the central processing unit. The program designated address range is from a base address stored in the base address register for a number of words of corresponding to word count register. In the preferred embodiment the program controlled cache state operation begins upon loading the word count register.

The cache operation unit may operate on fractional cache entries. In the embodiment the cache operation unit includes a two's complement unit. This two's complement unit forms the two's complement of M least significant bits of the base address register, where each cache entries has $2^M$ data words. A least number selector produces an output equal to the least of this two's complement, the word count $2^M$. The base address register is incremented by the least number selected and the word count register is decremented by this same least number select. The cache state control operations ends when the word count reaches zero.

The cache operation unit may operate only on whole cache entries. The base address register increments and the word count register decrements by the cache entry size. The cache state control operations ends when the word count reaches zero.

BRIEF DESCRIPTION OF THE DRAWINGS

These and other aspects of this invention are illustrated in the drawings, in which.

DETAILED DESCRIPTION OF PREFERRED EMBODIMENTS

Figure 1:
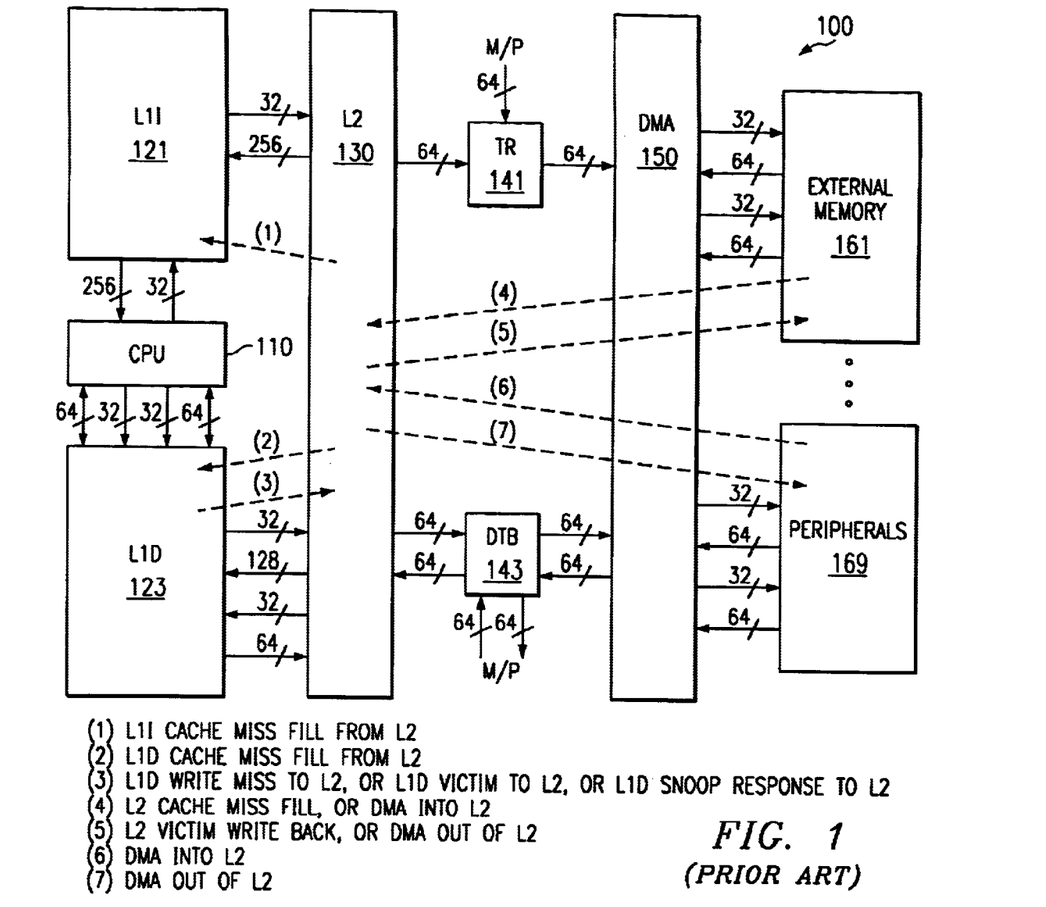
FIG. 1 illustrates the organization of a typical digital signal processor to which this invention is applicable.

FIG. 1 illustrates the organization of a typical digital signal processor system 100 to which this invention is applicable. Digital signal processor system 100 includes central processing unit core 110. Central processing unit core 110 includes the data processing portion of digital signal processor system 100. Central processing unit core 110 could be constructed as known in the art and would typically includes a register file, an integer arithmetic logic unit, an integer multiplier and program flow control units. An example of an appropriate central processing unit core is described below in conjunction with FIGS. 7, 8A and 8B.

Digital signal processor system 100 includes a number of cache memories. FIG. 1 illustrates a pair of first level caches. Level one instruction cache (L1I) 121 stores instructions used by central processing unit core 110. Central processing unit core 110 first attempts to access any instruction from level one instruction cache 121. Level one data cache (L1D) 123 stores data used by central processing unit core 110. Central processing unit core 110 first attempts to access any required data from level one data cache 123. The two level one caches are backed by a level two unified cache (L2) 130. In the event of a cache miss to level one instruction cache 121 or to level one data cache 123, the requested instruction or data is sought from level two unified cache 130. If the requested instruction or data is stored in level two unified cache 130, then it is supplied to the requesting level one cache for supply to central processing unit core 110. As is known in the art, the requested instruction or data may be simultaneously supplied to both the requesting cache and central processing unit core 110 to speed use.

Level two unified cache 130 is further coupled to higher level memory systems. Digital signal processor system 100 may be a part of a multiprocessor system. The other processors of the multiprocessor system are coupled to level two unified cache 130 via a transfer request bus 141 and a data transfer bus 143. A direct memory access unit 150 provides the connection of digital signal processor system 100 to external memory 161 and external peripherals 169.

In accordance with the preferred embodiment of this invention, level two unified cache 130 may be configured to include variable amounts of static random access memory (SRAM) instead of cache memory. This aspect of the digital signal processor system is further detailed in contemporaneously filed U.S. patent application Ser. No. 09/603,645 entitled UNIFIED MEMORY SYSTEM ARCHITECTURE INCLUDING CACHE AND DIRECTLY ADDRESSABLE STATIC RANDOM ACCESS MEMORY, which claims priority from U.S. provisional application Ser. No. 60/166,534 filed Nov. 19, 1999. In accordance with the invention described in this contemporaneously filed patent application some or all of level two unified cache 130 may be configured as normal read/write memory which operates under program control. If some of level two unified cache 130 is configured as SRAM, then this memory space may be either a source or a destination of a direct memory access. This will be more fully described below.

The complex interrelation of parts of digital signal processor system 100 permits numerous data movements. These are illustrated schematically in FIG. 1 and will be listed here. First, level one instruction cache 121 may receive instructions recalled from level two unified cache 130 (1) for a cache miss fill. In this example, there is no hardware support for self-modifying code so that instructions stored in level one instruction cache 121 are not altered. There are two possible data movements between level one data cache 123 and level two unified cache 130. The first of these data movements is a cache miss fill from level two unified cache 130 to level one data cache 123 (2). Data may also pass from level one data cache 123 to level two unified cache 130 (3). This data movement takes place upon; a write miss to level one data cache 123 which must be serviced by level two unified cache 130; a victim eviction from level one data cache 123 to level two unified cache 130; and a snoop response from level one data cache 123 to level two unified cache 130. Data can be moved between level two unified cache 130 and external memory 161. This can take place upon: a cache miss to level two unified cache 130 service from external memory (4) or a direct memory access 150 data movement from external memory 161 and level two unified cache 130 configured as SRAM; a victim eviction from level two unified cache 130 to external memory 161 (5) or a direct memory access 150 data movement from a portion of level two unified cache 130 configured as SRAM to external memory 161. Finally, data can move between level two unified cache 130 and peripherals 169. These movements take place upon: or a direct memory access 150 data movement from peripheral 169 and level two unified cache 130 configured as SRAM (6); or a direct memory access 150 data movement from a portion of level two unified cache 130 configured as SRAM to peripherals 169 (7). All data movement between level two unified cache 130 and external memory 161 and between level two unified cache 130 and peripherals 169 employ data transfer bus 143 and are controlled by direct memory access unit 150. These direct memory access data movements may take place as result of a command from central processing unit core 110 or a command from another digital signal processor system received via transfer request bus 141.

The number and variety of possible data movements within digital signal processor system 100 makes the problem of maintaining coherence difficult. In any cache system data coherence is a problem. The cache system must control data accesses so that each returns the most recent data. As an example, in a single level cache a read following a write to the same memory address maintained within the cache must return the newly written data. This coherence must be maintained regardless of the processes within the cache. This coherence preserves the transparency of the cache system. That is, the programmer need not be concerned about the data movements within the cache and can program without regard to the presence or absence of the cache system. This transparency feature is important if the data processor is to properly execute programs written for members of a data processor family having no cache or varying amounts of cache. The cache hardware must maintain the programmer illusion of a single memory space. An example of an ordering hazard is a read from a cache line just victimized and being evicted from the cache. Another example in a non-write allocate cache is a read from a cache line following a write miss to that address with the newly written data in a write buffer waiting write to main memory.

The cache system must include hardware to detect and handle such special cases.

A cache system including a second level cache, such as that described above in conjunction with FIG. 1, introduces additional hazards. Coherence must be maintained between the levels of cache no matter where the most recently written data is located. Generally level one caches accessing data will have the most recent data while the level two cache may have old data. If an access is made to the level two cache the cache system must determine if a more recent copy of the data is stored in a level one cache. This generally triggers a snoop cycle in which the level two cache polls the level one cache for more recent data before responding to the access. A snoop is nearly like a normal access to the snooped cache except that snoops are generally given higher priority. Snoops are granted higher priority because another level cache is stalled waiting on the response to the snoop. If the data stored in the lower level cache has been modified since the last write to the higher level cache, then this data is supplied to the higher level cache. This is referred to as a snoop hit. If the data stored in the lower level cache is clean and thus not been changed since the last write to the higher level cache, then this is noted in the snoop response but no data moves. In this case the higher level cache stores a valid copy of the data and can supply this data.

Additional hazards with a two level cache include snoops to a lower level cache where the corresponding data is a victim being evicted, snoops to data in during a write miss in the lower level cache for non-write allocation systems which places the data in a write buffer. Level two unified cache 130 may need to evict a cache entry which is also cached within level one instruction cache 121 or level one data cache 123. A snoop cycle is required to ensure the latest data is written out to the external main memory. A write snoop cycle is transmitted to both level one instruction cache 121 and level one data cache 123. This write snoop cycle misses if this data is not cached within the level one caches. Level one data cache 123 reports the snoop miss to level two unified cache 130. No cache states within level one data cache 123 are changed. Upon receipt of the snoop miss report, level two unified cache 130 knows that it holds the only copy of the data and operates accordingly. If the snoop cycle hits a cache entry within level one data cache 123, the response differs depending on the cache state of the corresponding cache entry. If the cache entry is not in a modified state, then level two unified cache 130 has a current copy of the data and can operate accordingly. The cache entry is invalidated within level one data cache 123. It is impractical to maintain cache coherency if level one data cache 123 caches the data and level two unified cache 130 does not. Thus the copy of the data evicted from level two unified cache 130 is no longer cached within level one data cache 123. If the cache entry in level one data cache 123 is in the modified state 303 and thus had been modified within that cache, then the snoop response includes a copy of the data. Level two unified cache 130 must merge the data modified in level one data cache 123 with data cached within it before eviction to external memory. The cache entry within level one data cache 123 is invalidated.

In a similar fashion snoop cycles are sent to level one instruction cache 121. Since the digital signal processing system 100 cannot modify instructions within level one instruction cache 121, no snoop return is needed. Upon a snoop miss nothing changes within level one instruction cache 121. If there is a snoop hit within level one instruction cache 121, then the corresponding cache entry is invalidated. A later attempt to fetch the instructions at that address will generate a cache miss within level one instruction cache 121. This cache miss will be serviced from level two unified cache 130.

Figure 2:
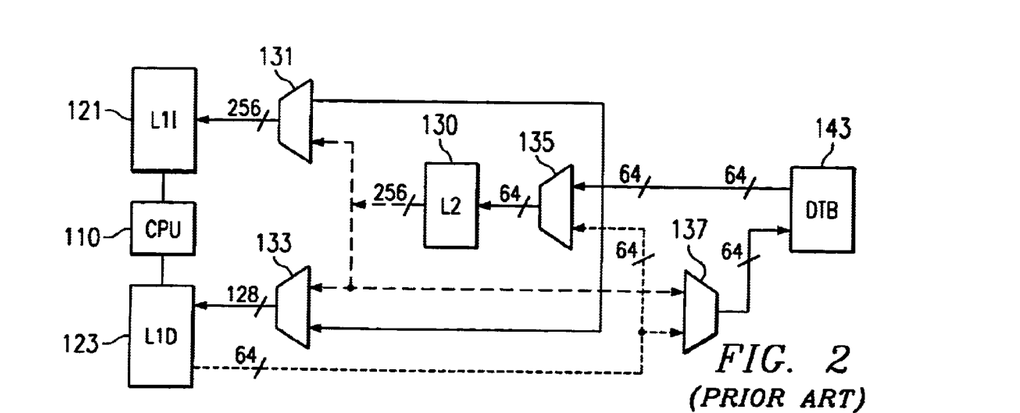
FIG. 2 illustrates the data paths to and from the level two unified cache illustrated in FIG. 1.

FIG. 2 illustrates the data connections among parts of digital signal processing system 100 illustrated in FIG. 1. FIG. 2 illustrates the data path widths between the various parts. The level one instruction cache interface includes a 256-bit data path from level two unified cache 130 to level one instruction cache 121. This data path size corresponds to one half of the 64 byte cache line size within level one instruction cache 121 and equals one instruction fetch packet. In the preferred embodiment, the 256-bits are 64 bits from each of the four banks of level two unified cache 130. Thus level two unified cache 130 can source this amount of data in a single cycle. This occurs regardless of the amount of level two unified cache 130 configured as cache. The cache/SRAM partitioning within level two unified cache 130 is across the data banks rather than within the data banks. Thus level two unified cache 130 can always supply 256 bits to level one instruction cache 121 if any part is partitioned as cache. Level one instruction cache 121 may also receive data directly from data transfer bus 143, for example upon fetching code from non-cacheable memory addresses. Data transfer bus 143 supplies only 64 bits per cycle, thus at least four cycles are needed to accumulate the 256 bits. The data source for transfers to level one instruction cache 121 is selected by multiplexer 131. FIG. 1 illustrates supply of 32 address bits from level one instruction cache 121 to level two unified cache 130. Because level one instruction cache 121 operates on 256 bit boundaries, the 8 least significant bits are always zero and may be omitted from the address. Note that writes to level one instruction cache 121 are not permitted, therefore level one instruction cache 121 never supplies data to level two unified cache 130.

The level one data cache interface includes a 128-bit data path from level two unified cache 130 to level one data cache 123. In the preferred embodiment, the 128 bits are 64 bits from each of two banks of level two unified cache 130. This assumes no bank conflicts with other data transfers. Level two unified cache 130 only services one cache fill data transfer to level one data cache 123 per cycle. Thus if two load/store units in central processing unit 110 each request data and produce a read cache miss within level one data cache 123, the two read miss requests to level two unified cache 130 are serviced in sequence. As noted above, the cache/SRAM partitioning of level two unified cache 130 is across the memory banks. Thus level two unified cache 130 can supply data to level one data cache 123 from two banks so long as level two unified cache 130 is partitioned to include some cache. Level one data cache 123 may also receive data directly from data transfer bus 143, for example upon fetching data from non-cacheable memory addresses. Data transfer bus 143 supplies only 64 bits per cycle, however accesses to non-cacheable memory addresses are at most 32 bits. In this case, the 32 bits are transferred in a single data transfer cycle. The data source for transfers to level one data cache 123 is selected by multiplexer 133. FIG. 1 illustrates supply of two sets of 32 address bits from level one data cache 123 to level two unified cache 130. Because level one data cache 123 operates on 64 bit boundaries, the 6 least significant bits are always zero and may be omitted from the address.

Level one data cache 123 may supply data to level two unified cache 130. This occurs on a write miss, a cache entry eviction and a response to a snoop hit to data in the modified state within level one data cache 123. It is possible that each of the load/store units within central processing unit 110 would require data transfer from level one data cache 123 to level two unified cache 130 in the same cycle. Upon a write miss within level one data cache 123, only the 32 bits of the write data is supplied from level one data cache 123 to level 2 unified cache 130. For either a cache eviction or a snoop data response, level one data cache 121 supplies 128 bits to level two unified cache 130, the same data width as opposite transfers. Data from level one data cache 123 may also be supplied to data transfer bus 143 as selected by multiplexer 137. This could occur as a result of a write to a non-cacheable address.

The interface between level two unified cache 130 and data transfer bus 143 includes two 64-bit data busses. A first of these data busses supplies data from data transfer bus 143 to level two unified cache 130. This data may be stored in level two unified cache 130 via a single 64-bit write port as selected by multiplexer 135. The second bus is a 64-bit bus supplying data from level two unified cache 130 or level one data cache 123 as selected by multiplexer 137. All transfers using data transfer bus 143 employ direct memory access unit 150 responsive to commands via transfer request bus 141.

The following description of the invention is directed to a generically described cache architecture which may have multiple levels. The features of the described invention may not be valid for all levels of the cache. However, it will generally be plain where features do and do not apply. Since most cache systems are limited to 2 levels at the most, the examples included in this application are limited to the two level cache architecture described in conjunction with FIGS. 1 and 2.

Prior cache writeback and invalidate mechanisms have required the programmer to perform multiple accesses to control registers to perform programmer directed cache operations. For example, if the programmer wishes to remove (evict) four lines in the cache, a write to four control register bits is normally required. In systems which implement a control register on which programmer directed cache operations are based, four writes must be performed. The programmer must provide program code to track the address between each write. While these methods are functional, they are costly in terms of software overhead. These methods generally require the programmer to have an understanding of the underlying cache architecture parameters. Suppose a block of 128-bytes is to be copied back to memory. If the cache architecture has a 32-byte line size, then four writes must be performed to order this writeback. If the cache architecture has a 64-byte line size cache, then only two writes are necessary. This prior approach natively inhibits the portability of instruction code that controls the cache.

The alternative approach of this invention employs a simple address and word count memory mapped control register structure. While the programmer is generally abstracted from the underlying cache architecture of the cache, the programmer is generally well aware of the required accesses that instruction code must perform and the memory usage of the process. Consequently, the programmer is well aware of the cache cycles that are required for particular code segments. Thus, a good solution to cache control is to provide the programmer direct address and word count control for programmer directed cache cycles. This is in contrast to requiring knowledge about the cache parameters such as line size, associativity, replacement policies, etc of the prior art.

Figure 3:
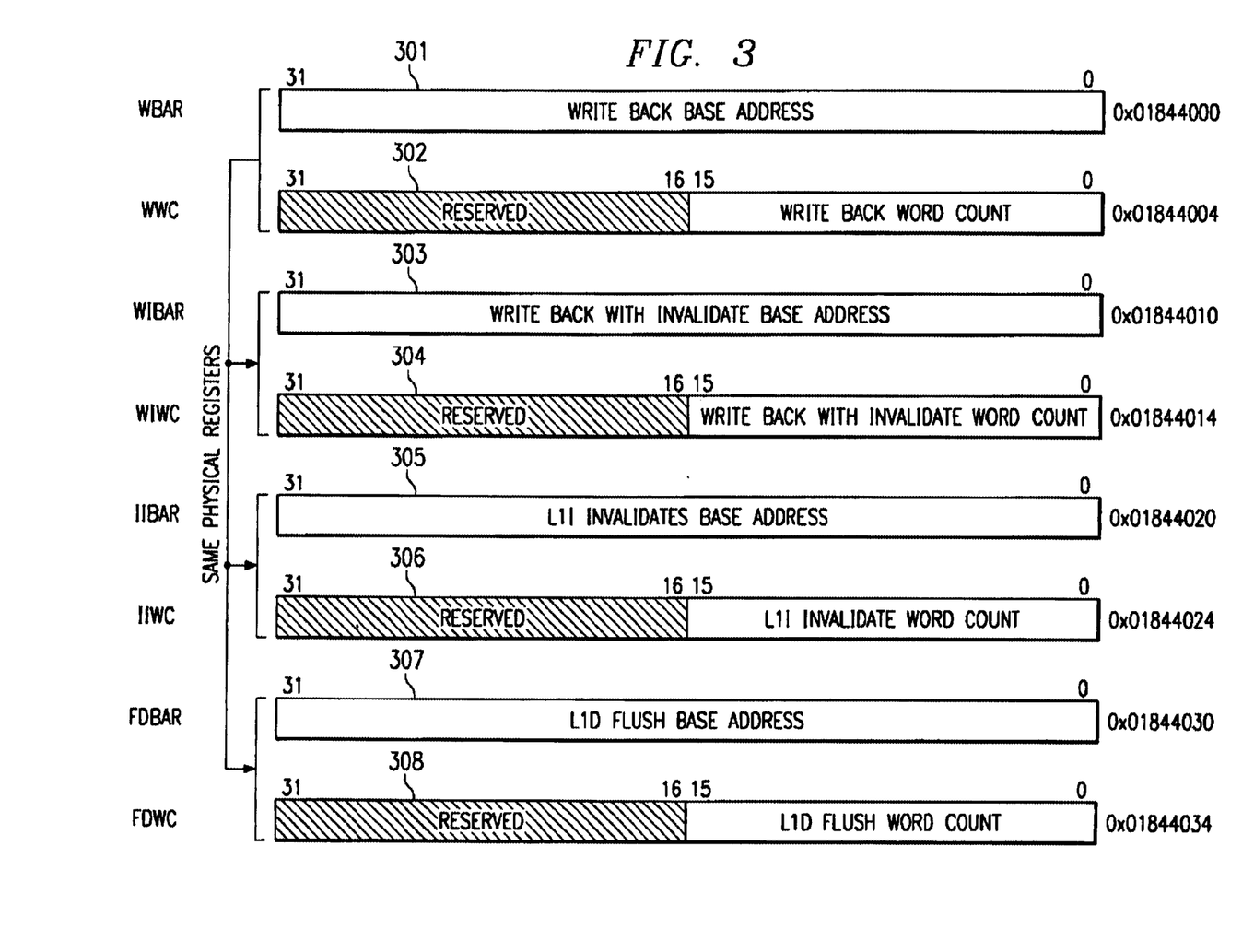
FIG. 3 illustrates the control registers employed in programmer control of caches.

FIG. 3 illustrates the memory mapping of the control registers 300 employed in the present invention. One skilled in the art would realize that the control registers illustrated in FIG. 3 are a subset of the possible control registers embodied in digital signal processor system 100. The control registers 300 illustrated in FIG. 3 are those control registers concerned with this invention. Control register 301 is called WBAR and named the writeback base address control register. In the preferred embodiment, this is a 32-bit register accessible at address Hex 01844000. Control register 302 is called WWC and named write back word count control register. WWC control register 302 is preferably 16 bits and accessible at address Hex 01844004. Programmed initiated writeback from level two unified cache 130 is accomplished by writing to WBAR control register 301 and WWC control register 302 in a manner that will be more fully explained below. Control register 303 is called WIBAR and named the writeback with invalidate base address control register. This is preferably a 32-bit register accessible at address Hex 01844010. Control register 304 is called WIWC and named writeback with invalidate word count control register and is accessible at address Hex 01844014. WIWC control register 304 is preferably 16 bits. Programmer initiated writeback with invalidate from level two unified cache 130 is accomplished by writing to WIBAR control register 303 and WIWC control register 304. Control register 305 is called IIBAR and named the level one instruction cache invalidate base address control register. This is preferably a 32-bit register accessible at address Hex 01844020. Control register 306 is called IIWC and named level one instruction cache invalidate word count control register and accessible at address Hex 01844024. IIWC control register 306 is preferably 16 bits. Programmed initiated invalidation of level one instruction cache 121 is accomplished by writing to IIBAR control register 305 and IIWC control register 306. Control register 307 is called FDBAR and named the level one data cache flush base address control register. This is preferably a 32-bit register accessible at address Hex 01844030. Control register 308 is called FDWC and named level one data cache flush word count control register and is accessible at address Hex 01844034. FDWC control register 308 is preferably 16 bits. Programmed initiated flush of level one data cache 123 is accomplished by writing to FDBAAR control register 307 and FDWC control register 308.

For each function there are two programmer accessible control registers. One of these control registers stores an address and the other stores a word count. These registers must be accessible to the central processing unit 110. Accesses to these registers must not be cached. In the preferred embodiment, these registers are in a special memory mapped control register set. The addresses of this control register set are detected as a non-cacheable by the cache controller. To use the mechanism, the programmer first writes to the base address control register with the base address for the corresponding cache operation. A second write to the corresponding word count control register sets the length of the operation. The word size of the word count is a function of central processing unit 110. The base address control register and word count control register feed a small state machine. This state machine interacts with the cache tag and writeback mechanisms used during normal operations to provide the appropriate cache control cycles.

Once the address and word count registers have been updated, the cache control cycles can begin. The start of the cache operations can be signaled via a control register write to a bit or another convenient mechanism. In the preferred embodiment a write to one of the word count control registers initiates the corresponding cache operation directly. Thus no third write to a start bit or other start function is required. Note that this technique requires that the write to the base address control register always occur before the write to the word count control register. This is a minor constraint on the programmer.

Figure 4:
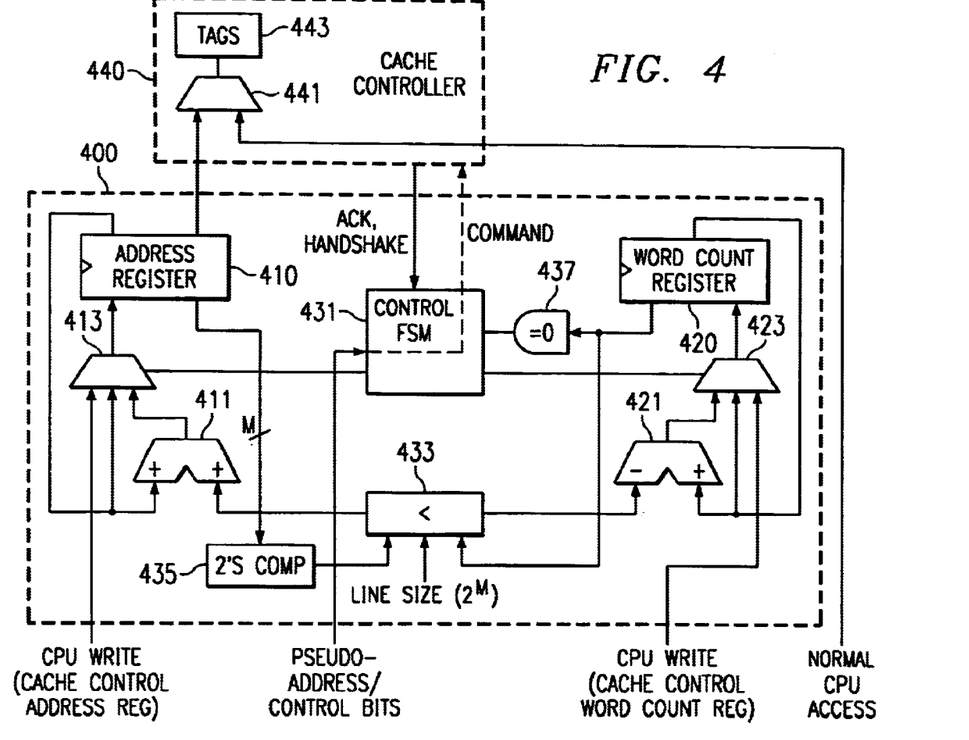
FIG. 4 illustrates the combined programmer initiated cache hardware of the preferred embodiment of this invention.

FIG. 4 illustrates the preferred embodiment of the state machine 400 employed in this invention for programmer directed cache operations. In the preferred embodiment a single physical base address register 410 is accessible at the logical addresses of writeback base address control register 301, writeback with invalidate base address control register 303, level one instruction cache invalidate base address control register 305 and level one data cache flush base address control register 307. In a similar fashion a single physical word count register 420 is accessible at the logical addresses of writeback word count control register 302, writeback with invalidate word count control register 304, level one instruction cache invalidate word count control register 306 and level one data cache flush word count control register 308. State machine 400 uses word count register 420 to gate its activity. State machine 400 supplies the output of address register 410 to cache controller 440 and specifically to cache tags 443 to perform pseudo-accesses. These pseudo-accesses are access of cache tags 443 only without a direct load or store operation.

Multiplexer 441 selects between normal access to cache tags 443 and programmer initiated cache operations. In the preferred embodiment, programmer initiated cache operations are triggered by a write to one of writeback word count control register 302, the writeback with invalidate word count control register 304, the level one instruction cache invalidate word count control register 306 or level one data cache flush word count control register 308. Controller 431 senses the write to one of the word count registers and triggers the corresponding programmer initiated cache operation via commands to cache controller 440. The address stored in physical base address register 410 is supplied to cache tags 443 via multiplexer 441. Controller 431 indicates the type of operation to cache controller 440. Physical base address register 410 is then incremented by adder 411. Note that multiplexer 413 selects either a write from central processing unit 110, the address in physical base address register 410 recirculated or the sum produced by adder 411. Adder 411 receives the address stored in physical base address register 410 at one input and the output of selector 433 at a second input. Selector 433 selects the least of three inputs. The first input is the output of 2's complement unit 435. The M least significant bits of physical base address register 410 form the input to 2's complement unit 435, where the cache entry size is $2^M$. The second input to selector 433 is the cache entry size $2^M$. The third input to selector 433 is the word count from physical word count register 420. Physical word count register 420 is similarly decremented by subtractor 421. Subtractor 421 receives the word count of physical word count register 420 at its normal or addition input. Subtractor 421 receives the output of selector 433 at its difference or subtraction input. Note that multiplexer 423 selects either a write from central processing unit 110, the word count in physical word count register 430 recirculated or the difference produced by subtractor 421.

Selector 433 makes the selection of an appropriate amount for every case. For the initial cycle, where the base address may not be aligned with the cache entries, the least input to selector 433 is the output of 2's complement unit 435. This number is the difference between the initial base address stored in physical base address register 410 and the next address boundary of cache entries. Adding this amount to base physical base address register 410 aligns the next cycle to the cache entry boundary. Physical word count register 420 is decremented by this amount. During middle cycles the least input to selector 433 is the number of data words in the cache entry. During these middle cycles the physical base address register 410 advances by the number of words in each cache entry and thus by whole cache entries. A final cycle may not be aligned with the cache entry boundary. For this final cycle the least input to selector 433 would be the data stored in physical word count register 420. This increases the address stored in physical address register 410 to the end of the determined range and decrements the word count stored in physical word count register 420 to zero. Following this final cycle, zero detector 437 signals that physical word count register 420 has decremented to zero. Controller 431 then ends the cache operation.

The address supplied by physical base address register 410 operates with the normal cache functions. If the word count was written to the address of writeback word count control register 302, then controller 431 signals cache controller 440 to writeback the cache entry accessed. Note that the address supplied by physical base address register 410 is compared with tags 441 and cache controller 440 acts only on a hit. This process continues until controller 431 stops the operation. If the word count was written to the address of writeback with invalidate word count control register 304, then controller 431 signals cache controller 440 to writeback the cache entry accessed and invalidate the cache entry. Again, cache controller 440 operates only on a hit to tags 441.

Cache controller 440 is able to snoop to level one instruction cache 121 and level one data cache 123. As noted above, some cycles in level two unified cache 130 cause snoop operations in the level one caches. A write to level one instruction cache invalidate word count control register 306 causes cache controller 440 to perform a snoop to level one instruction cache 121. Upon a snoop hit in level one instruction cache 121 the cache entry is invalidated. This is the same operation as performed for an eviction from level two unified cache 130. Similarly on a write to level one data cache flush word count control register 308 cache controller 440 causes a flush from level one data cache 123 if the snoop is a hit into level one data cache 123.

Other programmer initiated cache operations are feasible. For example, address range cache lock and cache unlock operations could use this mechanism. As already described and illustrated, state machine 400 would supply the appropriate address and commands to cache controller 440. Cache controller 440 would operate similarly to the known art to lock or unlock the cache entries including the addresses within the specified address range.

State machine 400 could make the completion of the programmer initiated cache operation visible to central processing unit 110. This could be by generation of an interrupt upon completion. Alternatively, state machine 400 could generate another type control signal. As a further alternative, physical word count register 420 is made readable by central processing unit 110. This permits central processing unit 110 to poll this register. If the word count is zero, then state machine 400 has completed the programmer initiated cache operation.

The above description of state machine 400 is an example of tight control. A tightly controlled cache control system requires full adders 411 and 421 to handle all possible alignments and word counts. Such a tight control handles cases in which the start and end of the specified address range is not aligned to a cache entry boundary. The base address increment and word count decrement are selected as the lesser of: the word count register; the 2's complement of the M least significant bits of the address; and the cache line size in words. This provides correct operation in the boundary cases.

Figure 5:
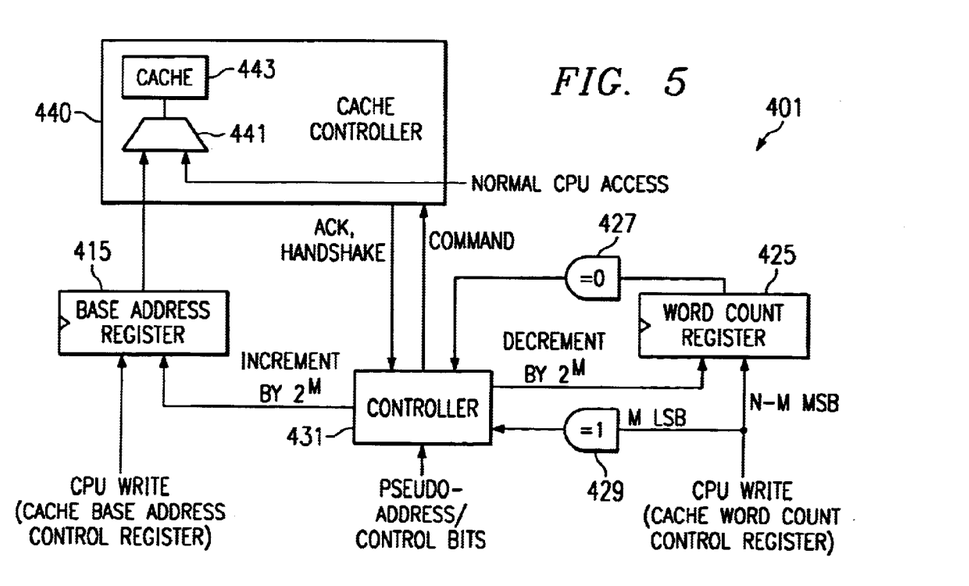
FIG. 5 illustrates an alternative programmer initiated cache hardware.

FIG. 5 illustrates state machine 401, which is an example of this invention implementing loose control. Loose control permits the use of simplified hardware as compared to that illustrated in FIG. 4. In loose control all operations take place on whole cache entries regardless of the address range alignment. Physical base address register 415 and physical word count register 425 are implemented as incrementable count registers. Physical base address register 415 receives write data for writes to the logical addresses of writeback base address control register 301, writeback with invalidate base address control register 303, level one instruction cache invalidate base address control register 305 and level one data cache flush base address control register 307. Physical word count register 425 receives the write data for writes to the logical addresses of writeback word count control register 302, writeback with invalidate word count control register 304, level one instruction cache invalidate word count control register 306 and level one data cache flush word count control register 308. Physical base address register 415 and physical word count register 425 may omit storage of the M least significant bits, where $2^M$ is the size of the cache entries. This omission is possible because only whole cache entries will be accessed. Ones detector 429 receives the M least significant bits written to physical word count register 425 and supplies a signal to controller 431 if any of these bits is a 1. For each update controller 431 controls physical base address register 415 to increment by $2^M$ and controls physical word count register 425 to decrement by $2^M$. By omission of the unneeded M least significant bits, these operations require change of a single bit and a carry ripple. Cache operations continue until zeros detector 427 detects that the N-M most significant bits of physical word count register 425 are all 0, N is the size of physical word count register 425. Except if ones detector 429 detected that at least one of the M least significant bits was a 1. In this case, the actual word count would have pointed to the next cache entry. Accordingly, controller 431 controls a final cache operation in this case.

The tightly controlled system illustrated in FIG. 4 is clearly the most robust, accounting for all special cases. In reality many cache systems may not require this level of exactness. In the loosely controlled system illustrated in FIG. 5, state machine 401 operates generally the same, as is the routing of the address register to the cache controller and the operation of the word count register. However, the adder and subtractor functions are simplified to increment and decrement by performing operations on complete cache lines. The data size may be reduced by M bits, where $2^M$ is the cache line size. The comparator and 2's complement functions are eliminated. In the loosely controlled system illustrated in FIG. 5, any cache entry which is within the address range of the base address and word count will be operated on. The effect of this is that more data is operated on than requested if the address and/or word count are not evenly divisible by $2^M$, however. Since this occurs in a cache which transparently services requests for data, this is often acceptable.

Figure 6:
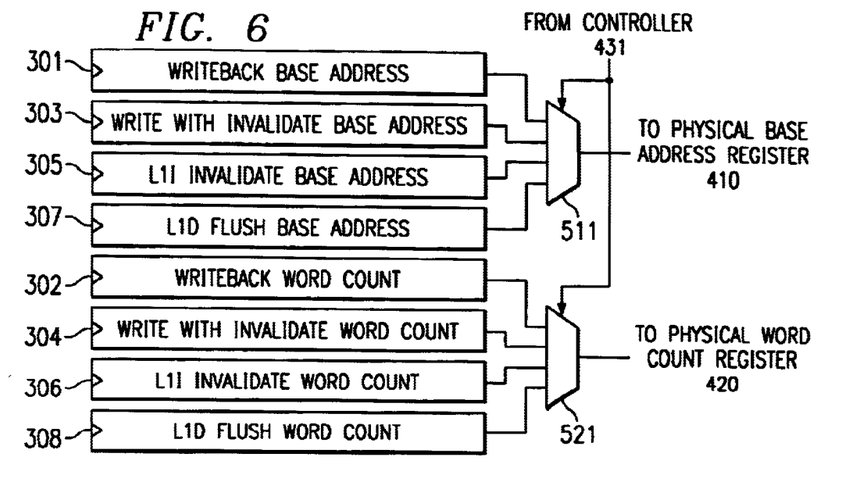
FIG. 6 illustrates an alternative permitting loading of the base address register and the word count register from separate physical registers.

FIG. 6 illustrates another modification of the preferred embodiment of FIG. 4. FIG. 6 illustrates separate physical registers 301 to 308 corresponding to the previously defined logical registers. Upon detection of a programmer initiated cache operation, controller 431 copies data from the corresponding physical registers 301 to 308 into the physical base address register 410 and physical word count register 420. As shown in FIG. 6, multiplexer 511 is controlled by controller 431 to select one of writeback base address control register 301, writeback with invalidate base address control register 303, level one instruction cache invalidate base address control register 305 and level one data cache flush base address control register 307. Similarly, multiplexer 521 is controlled by controller 431 to select one of writeback word count control register 302, writeback with invalidate word count control register 304, level one instruction cache invalidate word count control register 306 and level one data cache flush word count control register 308. Thus the hardware of state machine 400 may be reused while maintaining physical registers for each type cache operation supported.

As a further alternative, it is possible to provide a state machine like state machine 400 for each type cache operation supported. In this event simultaneous programmer initiated cache operations may occur with the addition of hardware to support such operations.

For most applications it is acceptable to simply reuse control registers such as physical base address register 410 and physical word count register 420 as part of a single state machine 400. As the cache operations are performed, physical base address register 410 and physical word count register 420 are dynamically updated by state machine 400. Thus these registers track the cache operation as it proceeds. One advantage of this scheme is the programmer can monitor the operations directly by monitoring the state of physical base address register 410 and physical word count register 420 to determine when accesses have completed.

The nature of cache operations that this mechanism initiates permits many optimizations. For example, if writebacks are being performed, it is not necessary to provide support for simultaneous execution of additional cache operations. The writeback operation will inherently bottleneck at the cache to memory interface. Thus other programmer initiated cache operations would not execute faster even if separate hardware support is provided. Such optimizations can result in fewer boundary conditions. For example, the hardware can be simplified by stalling subsequent writes from central processing unit 110 to base address control registers 301, 303, 305 and 307 and to word count control registers 302, 304, 306 and 308 until a current cache operation is complete. This not only prevents the central processing unit 110 from possibly corrupting the operation as it is in progress, but also prevents the cache design from having to deal with sporadic operations. Serializing cache operations this way allows the address and word counting hardware to be reused for multiple types of cache operations.

Figure 7:
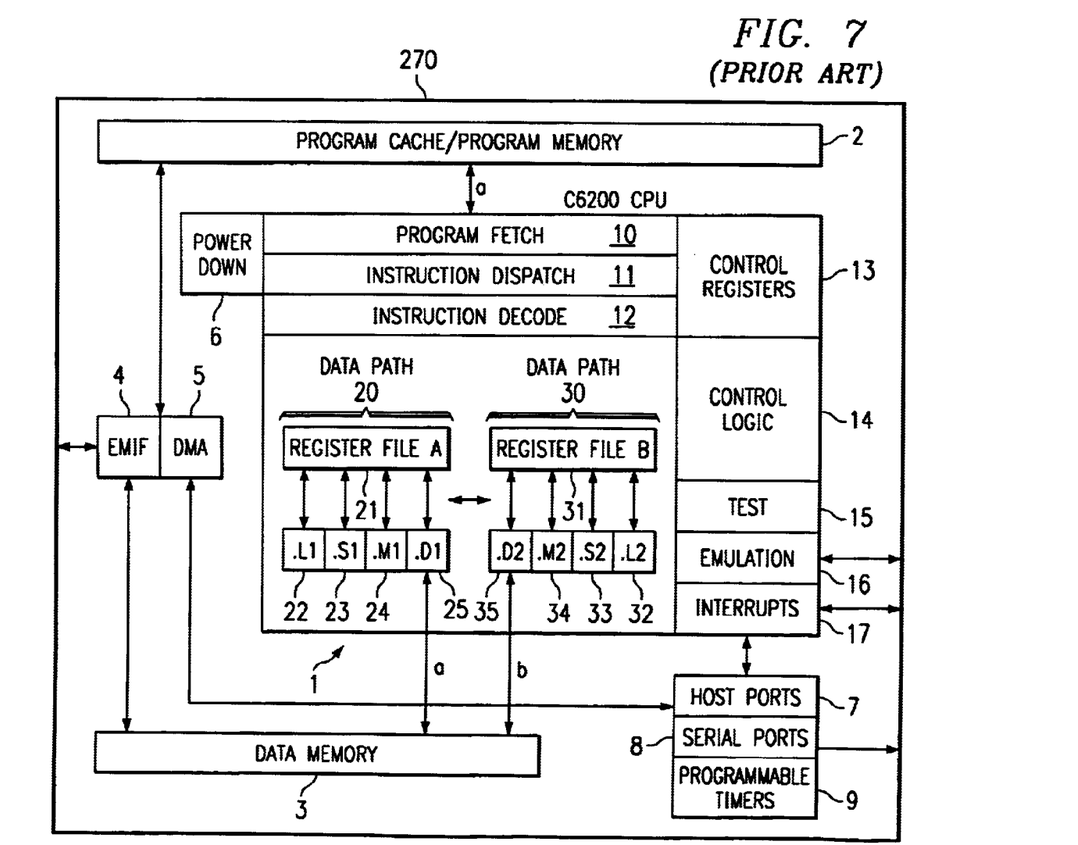
FIG. 7 illustrates details of a very long instruction word digital signal processor core suitable for use in FIG. 1.

FIG. 7 is a block diagram illustrating details of a digital signal processor core 270 suitable for use in this invention. The digital signal processor core of FIG. 7 is a 32-bit eight-way VLIW pipelined processor. This digital signal processor core includes central processing unit 1, shown in the right center portion of FIG. 7. This digital signal processor core includes program memory 2 which may optionally be used as a program cache. This digital signal processor core may also have varying sizes and types of data memory 3. This digital signal processor core also includes peripherals 4 to 9. These peripherals preferably include an external memory interface (EMIF) 4 and a direct memory access (DMA) controller 5. External memory interface (EMIF) 4 preferably supports access to supports synchronous and asynchronous SRAM and synchronous DRAM. Direct memory access (DMA) controller 5 preferably provides 2-channel auto-boot loading direct memory access. These peripherals includes power-down logic 6. Power-down logic 6 preferably can halt central processing unit activity, peripheral activity, and phase lock loop (PLL) clock synchronization activity to reduce power consumption. These peripherals also includes host ports 7, serial ports 8 and programmable timers 9.

Digital signal processor core 270 has a 32-bit, byte addressable address space. Internal memory on the same integrated circuit is preferably organized in a data space including data memory 3 and a program space including program memory 2. When off-chip memory is used, preferably these two spaces are unified into a single memory space via the external memory interface (EMIF) 4.

Program memory 3 may be internally accessed by central processing unit 1 via two internal ports 3a and 3b. Each internal port 3a and 3b preferably has 32 bits of data and a 32-bit byte address reach. Program memory 2 may be internally accessed by central processing unit 1 via a single port 2a. Port 2a of program memory 2 preferably has an instruction-fetch width of 256 bits and a 30-bit word (four bytes) address, equivalent to a 32-bit byte address.

Central processing unit 1 includes program fetch unit 10, instruction dispatch unit 11, instruction decode unit 12 and two data paths 20 and 30. First data path 20 includes four functional units designated L1 unit 22, S1 unit 23, M1 unit 24 and D1 unit 25 and 16 32-bit registers forming register file 21. Second data path 30 likewise includes four functional units designated L2 unit 32, S2 unit 33, M2 unit 34 and D2 unit 35 and 16 32-bit registers forming register file 31. Central processing unit 1 includes control registers 13, control logic 14, and test logic 15, emulation logic 16 and interrupt logic 17.

Program fetch unit 10, instruction dispatch unit 11 and instruction decode 12 unit recall instructions from program memory 2 and deliver up to eight 32-bit instructions to the functional units every instruction cycle. Processing occurs in each of the two data paths 20 and 30. As previously described above each data path has four corresponding functional units (L, S, M and D) and a corresponding register file containing 16 32-bit registers. Each functional unit is controlled by a 32-bit instruction. The data paths are further described below. A control register file 13 provides the means to configure and control various processor operations.

Figure 8A:
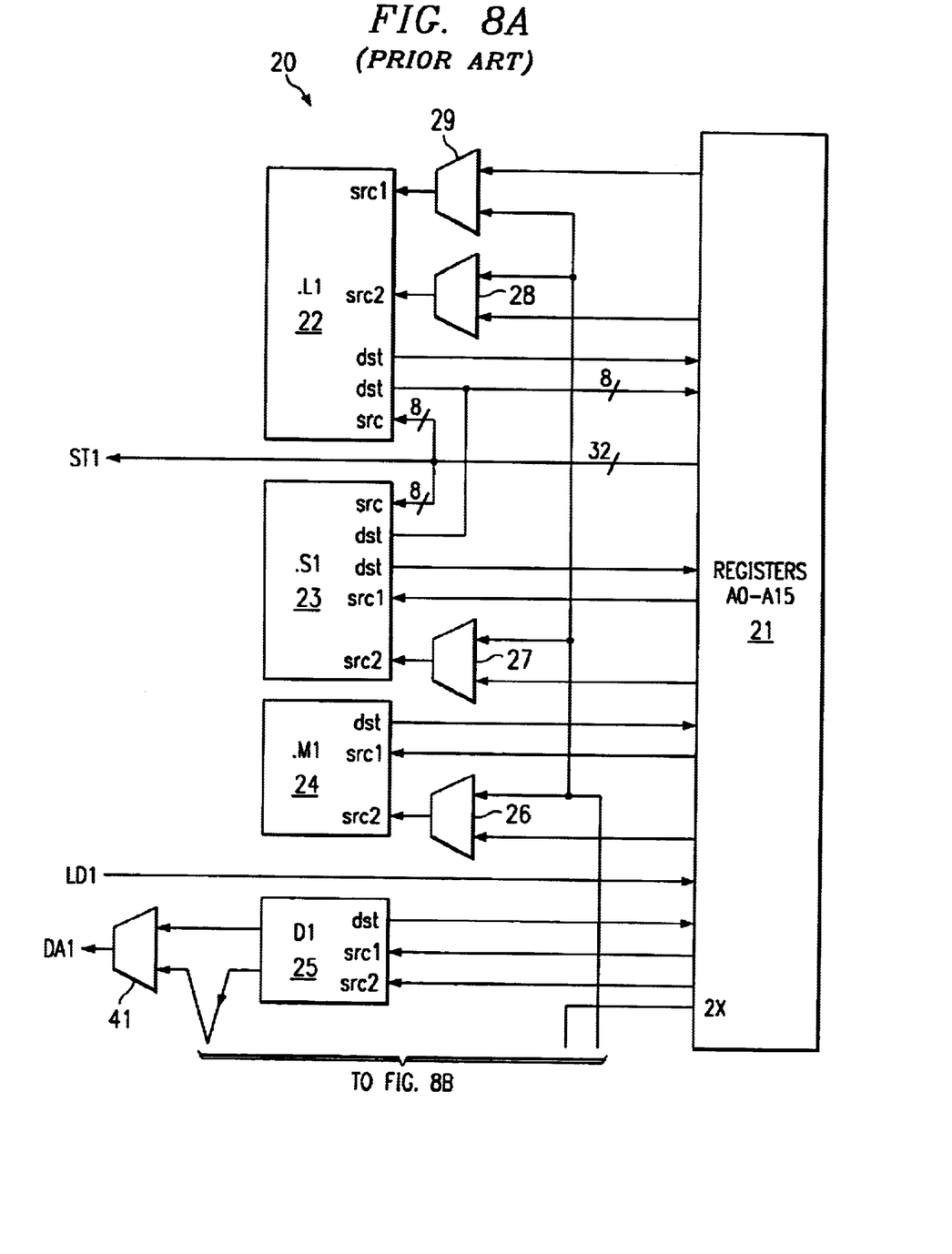
FIGS. 8A and 8B illustrate additional details of the digital signal processor of FIG. 7.
Figure 8B:
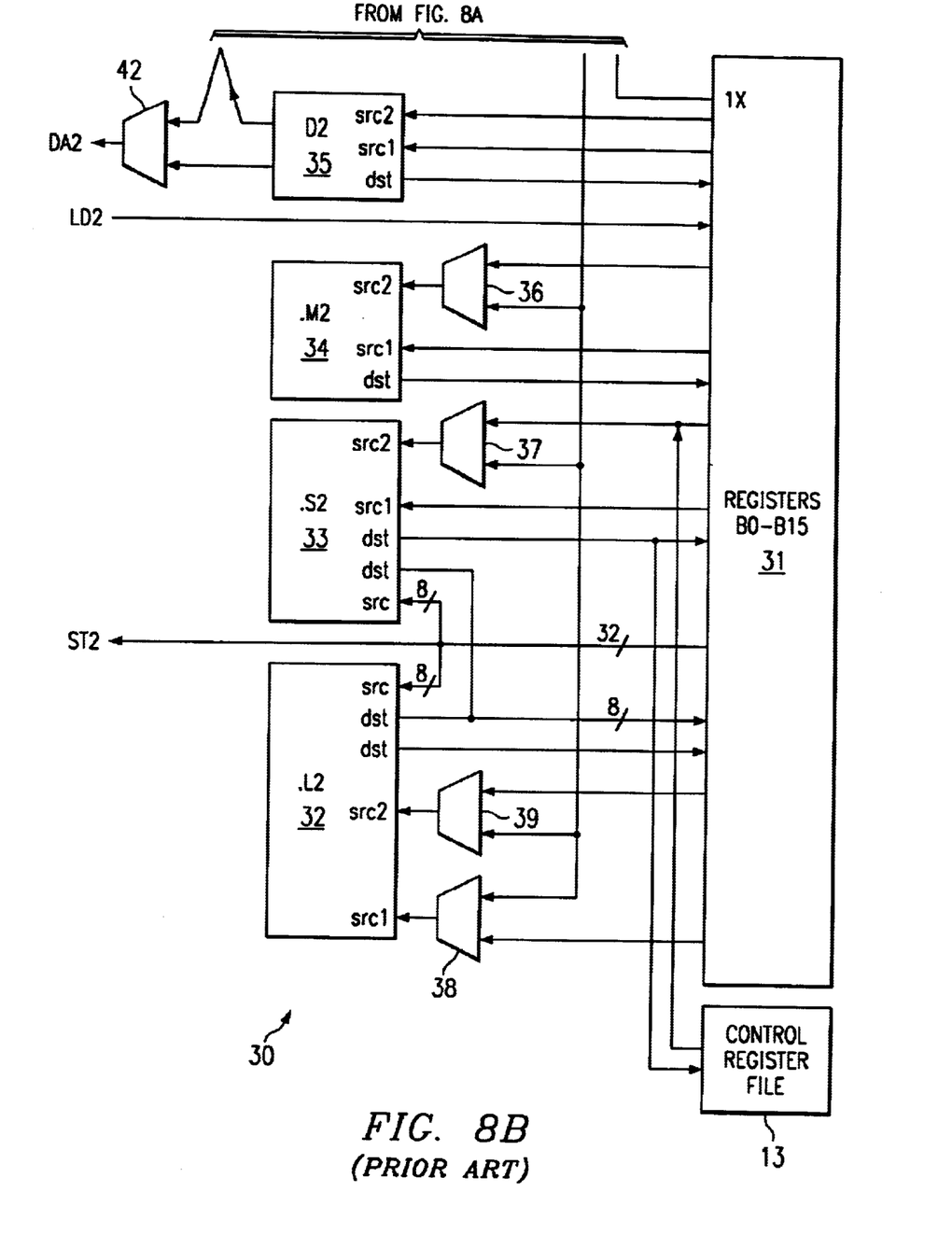

FIG. 8 illustrates the data paths of central processing unit 1. There are two general purpose register files 21 and 31. Each of general purpose register files 21 and 31 include 16 32-bit registers. These registers are designated registers A0 to A15 for register file 21 and registers B0 to B15 for register file 31. These general purpose registers can be used for data, data address pointers or as condition registers.

There are eight functional units L1 unit 22, L2 unit 32, S1 unit 23, S2 unit 33, M1 unit 24, M2 unit 34, D1 unit 25 and D2 unit 35. These eight functional units can be divided into two virtually identical groups of 4 (22 to 25 and 32 to 35) coupled to a corresponding register file. There are four types of functional units designated L, S, M and D. Table 1 lists the functional capabilities of these four types of functional units.

TABLE 1

| Functional Unit | Description |
| --- | --- |
| L Unit (L1, L2) | 32/40-bit arithmetic and compare operations<br>Left most 1, 0, bit counting for 32 bits<br>Normalization count for 32 and 40 bits<br>32 bit logical operations |
| S Unit (S1, S2) | 32-bit arithmetic and bit-field operations<br>32/40 bit shifts<br>32 bit logical operations<br>Branching<br>Constant generation<br>Register transfers to/from control register file |
| M Unit (M1, M2) | 16 × 16 bit multiplies |
| D Unit (D1, D2) | 32-bit add, subtract, linear and circular address calculation |

Most data lines within central processing unit 1 support 32-bit operands. Some data lines support long (40-bit) operands. Each functional unit has its own 32-bit write port into the corresponding general-purpose register file. Functional units L1 unit 22, S1 unit 23, M1 unit 24 and D1 unit 25 write to register file 21. Functional units L2 unit 32, S2 unit 33, M2 unit 34 and D2 unit 35 write to register file 31. As depicted in FIG. 8, each functional unit has two 32-bit read ports for respective source operands src1 and src2 from the corresponding register file. The four functional units L1 unit 22, L2 unit 32, S1 unit 23 and S2 unit 33 have an extra 8-bit wide write port for 40-bit long writes as well as an extra 8-bit wide read port for 40-bit long reads. Because each functional unit has its own 32-bit write port, all eight functional units can be used in parallel every cycle.

FIG. 8 illustrates cross register paths 1X and 2X. Function units L1 unit 22, S1 unit 23 and M1 unit 24 may receive one operand from register file 31 via cross register path 1X. Function units L2 unit 32, S2 unit 33 and M2 unit 34 may receive one operand from register file 21 via cross register path 2X. These paths allow the S, M and L units from each data path to access operands from either register file 21 or 31. Four functional units, M1 unit 24, M2 unit 34, S1 unit 23 and S2 unit 33, have one 32-bit input multiplexer which may select either the same side register file or the opposite file via the respective cross path 1X or 2X. Multiplexer 26 supplies an operand from either register file 21 or register file 31 to the second source input src2 of M unit 24. Multiplexer 36 supplies an operand from either register file 21 or register file 31 to the second source input src2 of M unit 34. Multiplexer 27 supplies an operand from either register file 21 or register file 31 to the second source input src2 of S unit 23. Multiplexer 37 supplies an operand from either register file 21 or register file 31 to the second source input src2 of S unit 33. Both the 32-bit inputs of function units L1 unit 22 and L2 unit 32 include multiplexers which may select either the corresponding register file or the corresponding cross path. Multiplexer 28 supplies the first source input src1 of L unit 22 and multiplexer 29 supplies the second source input src2. Multiplexer 38 supplies the first source input src1 of L unit 32 and multiplexer 39 supplies the second source input src2.

There are two 32-bit paths for loading data from memory to the register file. Data path LD1 enables loading register file A and data path LD2 enables loading register file B. There are also two 32-bit paths for storing register values to memory from the register file. Data path ST1 enables storing data from register file A to memory and data path ST2 enables storing data from register file B to memory. These store paths ST1 and ST2 are shared with the L unit and S unit long read paths.

FIG. 8 illustrates two data address paths (DA1 and DA2) coming from respective D units 25 and 35. These data address paths allow supply of data addresses generated by the D units to specify memory address. D unit 25 and D unit 35 each supply one input to address multiplexers 41 and 42. Address multiplexers 41 and 42 permit D unit 25 to support loads from memory to either register file 21 or register file 31 and to support stores from either register file 21 or register file 31 to memory. Address multiplexers 41 and 42 likewise permit D unit 35 to support loads and stores involving either register file 21 or register file 31.

FIG. 8 illustrates data paths enabling S2 unit 33 to read from and to write to the control register file 13.

An advantage of the technique of this invention is that the programmer need not know of the detailed specifications of the cache. The programmer need only specify with memory address ranges. Programmers would generally be very familiar with the address ranges used for storing various types of data and instructions. Additionally, programmers are generally experienced with viewing memory in this way. The state machine 400 takes care of all special cases and controls alignment to cache entry boundaries in a manner transparent to the programmer. Note that two different digital signal processor systems may be constructed with differing cache specifications, such as cache entry size and total size. The state machine 400 of each digital signal processing system is constructed with knowledge of the corresponding cache specification. The programmer initiated cache operations of the invention may be controlled using the same program code for the two different digital signal processor systems. This invention preserves the invisibility of cache details from the programmer.

What is claimed is:

1. A data processing system comprising:
    a central processing unit executing program instructions to manipulate data;
    at least one cache connected to said central processing unit temporarily storing in a plurality of cache lines at least one of program instructions for execution by said central processing unit and data for manipulation by said central processing unit, each cache line including a tag indicating a memory address of said program instruction or said data stored therein; and
    a cache operation unit connected to said at least one cache capable of performing a predetermined plurality of program controlled cache state operations and performing a selected one of said predetermined plurality of program controlled cache state operations on a corresponding program designated address range encompassing a plurality of cache lines.

2. The data processing system of claim 1, wherein:
    said at least one cache includes an instruction cache storing instructions for said central processing unit and a data cache storing data; and
    said predetermined plurality of program controlled cache state operations includes
        writeback of data cached from said program designated address range,
        writeback and invalidation of data cached from said program designated address range,
        invalidation of instructions stored in said instruction cache cached from said program designated address range, and
        flush of data stored in said data cache cached from said program designated address range.

3. The data processing system of claim 1, wherein:
    said cache operation unit includes two memory mapped control registers at addresses non-cacheable in said at least one cache corresponding to each of said predetermined plurality of program controlled cache state operations, said two memory mapped control registers determining said programmer designated address range for corresponding program controlled cache state operation.

4. The data processing system of claim 3, wherein:
    two memory mapped control registers corresponding to each of said predetermined plurality of program controlled cache state operations consist of
        a base address register loadable by said central processing unit,
        a word count register loadable by said central processing unit,
    wherein said program designated address range of a program controlled cache state operation is from a base address corresponding to data stored in said corresponding base address register for a number of words of corresponding to data stored in said corresponding word count register.

5. The data processing system of claim 4, wherein:
    a program controlled cache state operation triggers upon writing to said corresponding word count register.

6. The data processing system of claim 3, wherein:
    a program controlled cache state operation triggers upon writing to a corresponding one of said two corresponding memory mapped control registers.

7. The data processing system of claim 6, further comprising:
    said cache operation unit stalls writes to any of said two memory mapped control registers corresponding to any of said predetermined plurality of program controlled cache state operations until a current program controlled cache state operation completes.

8. A data processing system comprising:
    a central processing unit executing program instructions to manipulate data;
    at least one cache connected to said central processing unit temporarily storing at least one of program instructions for execution by said central processing unit and data for manipulation by said central processing unit; and
    a cache operation unit connected to said at least one cache performing a program controlled cache state operation on a program designated address range, said cache operation unit including
        a base address register loadable by said central processing unit,
        a word count register loadable by said central processing unit,
    wherein said program designated address range of said program controlled cache state operations are from a base address corresponding to data stored in said base address register for a number of words of corresponding to data stored in said word count register; and
    wherein said program controlled cache state operation triggers upon loading said word count register.

9. A data processing system comprising:
    a central processing unit executing program instructions to manipulate data;
    at least one cache connected to said central processing unit temporarily storing at least one of program instructions for execution by said central processing unit and data for manipulation by said central processing unit; and a cache operation unit connected to said at least one cache performing a program controlled cache state operation on a program designated address range, said cache operation unit including a base address register loadable by said central processing unit, a word count register loadable by said central processing unit, a two's complement unit connected to said base address register forming a two's complement of M least significant bits of said base address register, where said at least one cache has entries of $2^M$ data words, a least number selector connected to said word count register and said two's complement unit producing an output equal to the least of said two's complement of M least significant bits of said base address register, said word count stored in said word count register and $2^M$, an incrementer connected to said base address register and said least number selector for incrementing said base address register by said output of said least number selector, and a decrementer connected to said word count register and said least number selector for decrementing said word register by said output of said least number selector; and wherein said program designated address range of said program controlled cache state operations are from a base address corresponding to data stored in said base address register for a number of words of corresponding to data stored in said word count register.

10. A data processing system comprising:

a central processing unit executing program instructions to manipulate data;

at least one cache connected to said central processing unit temporarily storing at least one of program instructions for execution by said central processing unit and data for manipulation by said central processing unit; and a cache operation unit connected to said at least one cache performing a program controlled cache state operation on a program designated address range, said cache operation unit including a base address register loadable by said central processing unit, a word count register loadable by said central processing unit, an incrementer connected to said base address register for incrementing said base address register by $2^M$, where said at least one cache has entries of $2^M$ data words, and a decrementer connected to said word count register and said least number selector for decrementing said word register by $2^M$; and wherein said program designated address range of said program controlled cache state operations are from a base address corresponding to data stored in said base address register for a number of words of corresponding to data stored in said word count register.

11. A data processing system comprising:

a central processing unit executing program instructions to manipulate data;

at least one cache connected to said central processing unit temporarily storing in a plurality of cache lines at least one of program instructions for execution by said central processing unit and data for manipulation by said central processing unit, each cache line including a tag indicating a memory address of said program instruction or said data stored therein; and a cache operation unit connected to said at least one cache locking each cache line of said at least one cache currently caching data from a program designated address range encompassing a plurality of cache lines.

12. The data processing system of claim 11, wherein:

said program controlled cache state operation consists of unlocking locked data cached from said program designated address range encompassing a plurality of cache lines.

13. A data processing system comprising:

a central processing unit executing program instructions to manipulate data;

at least one cache connected to said central processing unit temporarily storing in a plurality of cache lines at least one of program instructions for execution by said central processing unit and data for manipulation by said central processing unit, each cache line including a tag indicating a memory address of said program instruction or said data stored therein; and a cache operation unit connected to said at least one cache performing a program controlled cache state operation on a program designated address range encompassing a plurality of cache lines, said cache operation unit being further connected to said central processing unit and generating an interrupt to said central processing unit upon completion of said program controlled cache state operation.

14. A data processing system comprising:

a central processing unit executing program instructions to manipulate data;

at least one cache connected to said central processing unit temporarily storing at least one of program instructions for execution by said central processing unit and data for manipulation by said central processing unit; and a cache operation unit connected to said at least one cache locking each cache line of said at least one cache currently caching data from a program designated address range encompassing a plurality of cache lines, said cache operation unit including a base address register loadable by said central processing unit, a word count register loadable by said central processing unit, wherein said locking each cache line of said at least one cache currently caching data from said program designated address range encompassing a plurality of cache lines are from a base address corresponding to data stored in said base address register for a number of words of corresponding to data stored in said word count register.

15. The data processing system of claim 14, wherein:

said program controlled cache state operations consists of unlocking locked data cached from said program designated address range encompassing a plurality of cache lines.

16. A data processing system comprising:

a central processing unit executing program instructions to manipulate data;

at least one cache connected to said central processing unit temporarily storing at least one of program instructions for execution by said central processing unit and data for manipulation by said central processing unit;

a cache operation unit connected to said at least one cache performing a program controlled cache state operation on a program designated address range, said cache operation unit including
- a base address register loadable by said central processing unit,
- a word count register loadable by said central processing unit,
- said base address register and said word count register consisting of memory mapped control registers at addresses non-cacheable in said at least one cache; and wherein said program designated address range of said program controlled cache state operations are from a base address corresponding to data stored in said base address register for a number of words of corresponding to data stored in said word count register.

* * * * *